United States Patent [19]

Koltookian

[11] 4,384,728

[45] May 24, 1983

[54] FLUID SEALING ARRANGEMENT

[75] Inventor: Sarkis A. Koltookian, Waterloo, Iowa

[73] Assignee: Deere & Company, Moline, Ill.

[21] Appl. No.: 241,790

[22] Filed: Mar. 9, 1981

[51] Int. Cl.³ .......................... F16J 9/00; F16L 17/00
[52] U.S. Cl. .................................. 277/167.5; 277/180
[58] Field of Search ...................... 277/12, 180, 167.3, 277/167.5

[56] References Cited

U.S. PATENT DOCUMENTS 3,329,447  7/1967  Hitz ................................. 277/167.5
4,114,906  9/1978  Jelinek ............................... 277/180

OTHER PUBLICATIONS

Exhibit A relating to a bushing and o-ring sealing assembly which has been on sale prior to the applicant's invention.

Primary Examiner—Robert I. Smith

[57] ABSTRACT

A pair of housings include fluid passages for communicating pressurized fluid therethrough. First and second bores in the housings each have one end open to fluid passages and have their other ends open at mating surfaces of the housings. A hollow, cylindrical bushing is press-fitted into the first bore. A hollow, cylindrical rubber packing is placed in the second bore. The bushing is axially longer than the second bore so that the outer end of the packing engages a corresponding end of the bushing. As the housings are drawn together, the packing is axially compressed between the bushing and the annular bottom of the second bore. Compression of the packing causes it to seal against the bushing and against the wall and bottom of the second bore so that fluid is confined to the interior of the bushing and packing as it flows between the passages.

4 Claims, 1 Drawing Figure

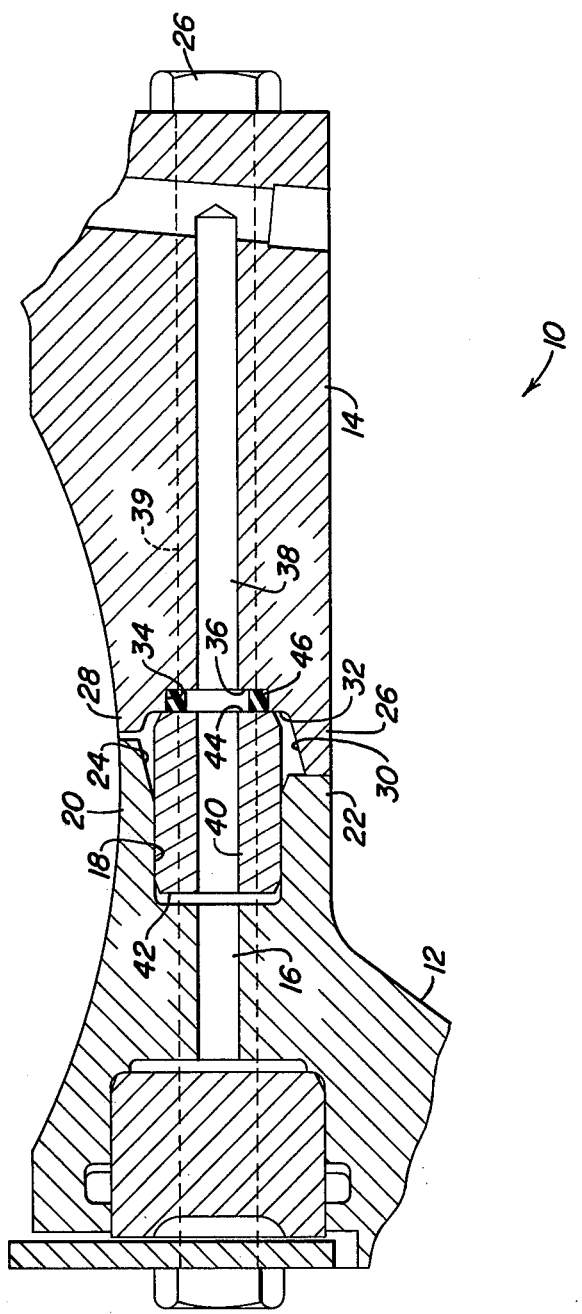

FLUID SEALING ARRANGEMENT

BACKGROUND OF THE INVENTION

This invention relates to a sealing assembly for maintaining a fluid-tight seal around the passages which extend through two separate housing portions.

In the construction of certain types of machinery, it is often necessary to couple together, by means of bolts or other suitable devices, two separate sections of a housing assembly. It also is often necessary to communicate pressurized fluid, such as hydraulic fluid, between passages in the two housing sections. Fluid seals have been maintained in such assemblies by means of a single, hollow cylindrical bushing having sections received by corresponding bores in the two housing sections. Each bushing section included a groove-mounted O-ring to seal between each bushing section and the wall of the corresponding housing bore. However, such a single bushing seal required that the bores in the two separate housing sections be precisely aligned to prevent damage to the O-rings, the bushing or the housing sections as the two housing sections are drawn together around the single bushing during final assembly. Accordingly, it would simplify the assembly process and reduce the number of damaged parts if a sealing arrangement were available which would maintain a fluid seal between the housing sections while permitting a certain amount of misalignment between the housing sections as they are drawn together.

SUMMARY OF THE INVENTION

An advantage of the present invention is that it provides a sealing arrangement which permits a certain amount of misalignment between separate housings as they are drawn together.

Another advantage of the present invention is that it provides an inexpensive sealing arrangement with parts which need not be assembled to close tolerances.

Another advantage of the present invention is that it provides a fluid-tight seal between separate housings without the use of O-rings.

These and other advantages are achieved, according to the present invention, which provides a pair of housings which may be bolted together. The housings include bores which communicate with each other when the housings are bolted together. A hollow, cylindrical steel bushing is press-fitted into one of the bores.

A hollow, cylindrical rubber packing is placed in the other bore. The packing extends axially beyond the outer end of the other bore so that the bushing and the packing engage each other as the housings are drawn together. The engagement between the bushing and the packing causes axial compression of the packing so that it sealingly engages and is trapped by the walls of the other bore and so that it seals against the bushing, thus providing a fluid-tight seal between the two housings.

BRIEF DESCRIPTION OF THE DRAWING

The FIGURE is a cross-sectional view of a pair of housings incorporating the applicant's sealing arrangement.

DETAILED DESCRIPTION

A two-piece housing, such as a differential housing, includes first and second housing halves 12 and 14, respectively. Housing 12 includes a passage 16 for communicating pressurized fluid from a pump (not shown) to an inner end of a cylindrical bore 18 which extends into a side of the housing 12 having relatively raised and lowered rim portions 20 and 22, respectively. A tapered base portion 24 interconnects the cylindrical bore 18 with the surfaces of the rim portions 20 and 22.

Housing 14 includes raised and lowered rim portions 26 and 28 for a complementary fit with the rim portions 22 and 20 of housing 12. A tapered bore 30 extends from the surface of rims 26 and 28 to an axially and outwardly facing outer shoulder 32. Shoulder 32 coaxially surrounds the outer end of a cylindrical bore 34 which extends into housing 14 and terminates at an inner axially and outwardly facing annular shoulder 36. Shoulder 36 interconnects the wall of bore 34 with a fluid passage 38 which communicates fluid from the bores 30 and 34 to a hydraulic function (not shown). A plurality of bolt-receiving bores 39, one of which is shown with dashed lines in FIG. 1, extends through both housing halves 12 and 14.

A hollow cylindrical steel bushing 40 is press-fitted into bore 18 so that its outer surface sealingly engages the wall of bore 18. The length of bore 18 is such that the inwardly facing end 42 of bushing 40 does not engage the annular bottom surface of bore 18. The length of the press-fit between bore 18 and bushing 40 is sufficient to prevent shifting of bushing 40 from axial alignment with the axis of bore 18. The outwardly facing annular end 44 of bushing 40 extends towards the outer shoulder 32 of housing 14. The diameter of the tapered bore 30 is such that a substantial clearance is maintained between the wall of the tapered bore 30 and the outer surface of bushing 40.

A hollow, cylindrical packing 46, formed out of a deformable material, such as fluorocarbon rubber, is inserted into bore 34 of housing 14 with one end engaging the inner shoulder 36 of housing 14. The axial length of packing 46 is slightly longer than the axial separation of shoulders 32 and 36 so that the other end of packing 46 engages the outwardly facing end 44 of bushing 40. The outer diameter of packing 46 is smaller than the outer diameter of bushing 40 and the inner diameter of packing 46 is larger than the inner diameter of bushing 40 so that a portion of the annular end face of bushing 40 covers the entire outer end face of packing 40.

The clearance between bushing 40 and the wall of tapered bore 30 permits the two housing halves 12 and 14 to be bolted together without damage to the bushing 40, the packing 46 or the housing halves 12 and 14, despite radial or angular misalignment of the passages 16 and 38. As the housings are bolted together, the annular end 44 of bushing 40 first engages the outwardly facing annular end of packing 46 which is axially compressed between bushing 40 and the shoulder 36. When the packing 46 is axially compressed to approximately 74% of its original axial length, the end face 44 of bushing 40 engages shoulder 32 of housing 14 so that additional movement of the housings, toward each other, forces the bushing 40 further into bore 18 and further compression of packing 46 is prevented. This compression of packing 46 causes it to tightly seal against bushing 40 and shoulder 32 and to radially expand to tightly seal against the wall of bore 34. Thus, pressurized fluid may be communicated from passage 16 in housing 12 through the hollow bushing 40 and packing 46 to the passage 38 in housing 14 without leakage to the exterior of housings 12 and 14.

I claim:

1. A sealed fluid communicating system comprising:
   a first housing having a first fluid passage therein and a first walled bore extending from the first passage to one side of the first housing;
   a second housing for coupling to the first housing, having a second fluid passage, a second walled bore extending from the second passage to one side of the second housing, and having first and second axially spaced apart and outwardly and axially facing shoulders;
   a hollow bushing mounted in the first bore, and having a peripheral surface for sealingly engaging the wall of the first bore, and having a first annular end face facing away from the first housing;
   a hollow packing mounted in the second bore in engagement with the second shoulder, having a second annular end face for sealingly engaging the first annular end face of the bushing; and
   means for rigidly coupling the housing sections together with the first and second bores communicated with each other and for holding the bushing and the packing in sealing engagement with each other and under axial compression, the first annular end face of the bushing being engageable with the first shoulder of the second housing to limit axial compression of the packing.

2. The sealed fluid system of claim 1, wherein:
   the first shoulder coaxially surrounds an outer end of the second bore; and
   the second shoulder is comprised of an annular surface interconnecting the wall of the second bore and the second passage.

3. The sealed fluid system of claim 1, wherein:
   the bushing has an outer diameter which is larger than the outer diameter of the packing, the bushing also having an inner diameter which is smaller than the inner diameter of the packing.

4. The sealed fluid system of claim 1, wherein:
   the first bore terminates at an annular bottom surface interconnecting the wall of the first bore and the first passage, the bottom surface being axially spaced apart from the first bushing.

* * * * *